O. STODDARD.
Hand Seeder.

No. 13,151.

Patented June 26, 1855.

UNITED STATES PATENT OFFICE.

OREN STODDARD, OF BUSTI, NEW YORK.

IMPROVEMENT IN CORN-PLANTERS TO BE OPERATED BY HAND.

Specification forming part of Letters Patent No. 13,151, dated June 26, 1855.

*To all whom it may concern:*

Be it known that I, OREN STODDARD, of Busti, in the county of Chautauqua and State of New York, have invented a new and Improved Corn-Planter to be Operated by Hand; and I do hereby declare that the following is a full, clear, and exact description of the same, reference being had to the annexed drawings, making a part of this specification, in which—

Figure 1:
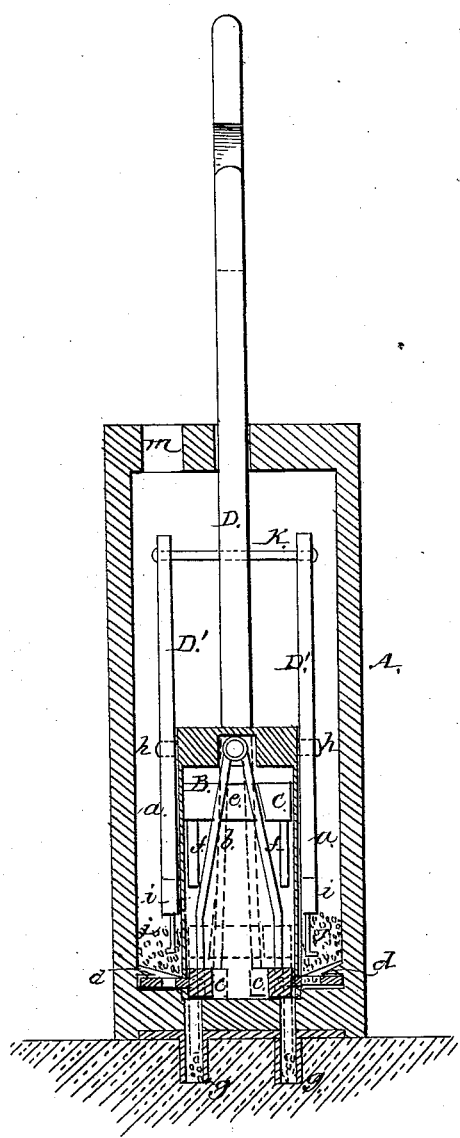
Figure 2:
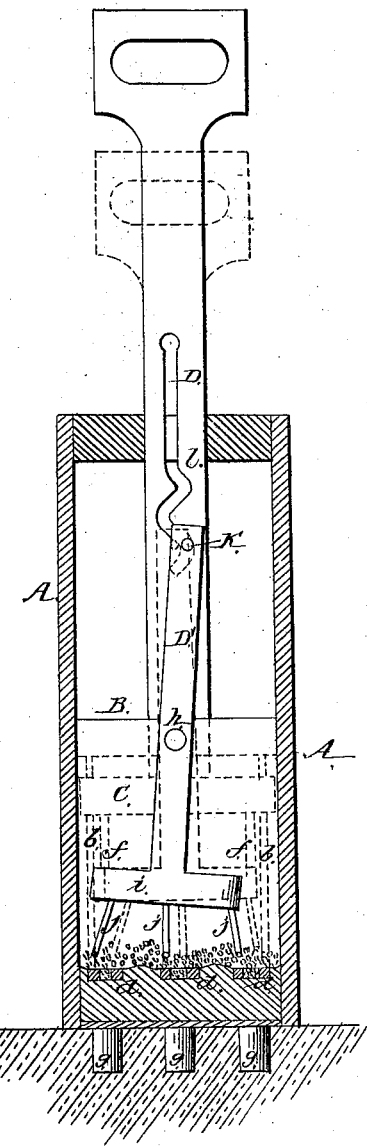

Figures 1 and 2 are vertical sections of my improvement, the planes of section crossing each other at right angles.

Similar letters of reference indicate corresponding parts in the two figures.

The nature of my invention consists in the peculiar arrangement of a follower or plunger provided with a series of clearers or rods, dropping-slides, and distributers and agitators placed within a suitable case and operating as will be presently shown and described.

To enable others skilled in the art to fully understand and construct my invention, I will proceed to describe it.

A represents a case of rectangular form and of a suitable size, and having within it a smaller case, B. (Clearly shown in Fig. 1.) Within the smaller case, B, there is fitted a follower or plunger, C, to which a handle or rod, D, is attached, said handle or rod passing up through the top or cover of the case A. The smaller case, B, in one direction is equal to the breadth of the case A, as shown in Fig. 2; but it is narrower in the other direction, as shown in Fig. 1, so as to leave a space, *a*, at each side between the smaller and larger cases.

To the upper part of the smaller case, B, there are attached two springs, *b b*, at opposite sides. The lower ends of these springs are attached to bars *c c* at the lower part of the case, to which bars perforated plates or dropping-slides are attached, the plates or slides working through apertures in the lower sides of the case B and over the bottoms of the spaces *a*. The ends of the follower or plunger C have recesses or notches *e* made in them, in which the springs *b b* fit. (See Fig. 1.)

To the under surface of the follower or plunger C there are attached a series of rods, *f*. Any proper number may be used. Probably six would be sufficient—three at each side of the follower or plunger—and through the bottom of the case A there are made a corresponding number of holes, over which short tubes *g* are secured.

To each side of the smaller case, B, there is attached by a pivot, *h*, a lever, D'. The lower ends of the levers D' have each a cross-bar, *i*, attached to them, and vertical rods *j* are attached to the lower surfaces of the cross-bars. The upper ends of the two levers D' D' are connected by a cross-rod, *k*, which rod passes through a slot, *l*, in the handle or rod D of the follower or plunger C. The upper part of the slot *l* is straight and the lower part of zigzag form, as shown in Fig. 2.

The top or cover of the case A has an aperture, *m*, made through it, as shown in Fig. 1.

The implement is operated as follows: The case A is filled with corn, and the rod or handle D is drawn upward, as shown in black. The tubes *g* are then forced into the ground and the handle or rod D pressed downward. As the follower or plunger C descends the springs *b b* are contracted and the plates or distributing-slides *d* are drawn within the smaller case, B, and the apertures in the slides are brought directly underneath the rods *f*, attached to the follower or plunger, and the zigzag portion of the slot *l* operates the levers D' D', and the rods *j*, which are attached to the cross-bars *i* of the levers, are moved or vibrated, and cause the corn to enter the apertures in the plates or slides *d*, previously to their being drawn within the case B. As the follower or plunger C descends the rods *f* force the corn from the apertures in the plates or slides *d* down within the tubes *g* and leave the corn the requisite distance in the ground. (See red lines, Fig. 1.) As the follower or plunger is drawn upward the springs *b b* are allowed to expand, and the plates or slides *d* return to their original position.

The above implement is extremely simple, and is intended to be operated by hand. It can be manufactured cheaply, and its operation is sure.

I am aware that many devices have been used and patented for planting corn both by hand and horse-power, and several of the parts of my implement have been used in various machines, but differently arranged—the dropping or sliding plates, for instance, and the agitators.

I do not claim any of the within-described parts separately or irrespective of the arrangement herein shown; but What I do claim as new, and desire to secure by Letters Patent, is—

The arrangement of the follower or plunger C, dropping or sliding plates d, and agitators or distributers formed by the levers D' D', provided with cross-arms i and rods j, the above parts being operated as shown, and for the purpose set forth.

OREN STODDARD.

Witnesses:
EMRY DAVIS,
W. B. MARTIN.